2 Sheets—Sheet 1.

N. R. CARRINGTON.
Cotton-Planter.

No. 27,350.

Patented Mar. 6, 1860.

Witnesses:

Inventor:

N. R. CARRINGTON.
Cotton-Planter.

No. 27,350.

2 Sheets—Sheet 2.

Patented Mar. 6, 1860.

Witnesses:
Aug. Walton
Jno. Wilson

Inventor:
N. R. Carrington

UNITED STATES PATENT OFFICE.

N. R. CARRINGTON, OF COLD WATER, MISSISSIPPI.

IMPROVEMENT IN SEED-PLANTERS.

Specification forming part of Letters Patent No. 27,350, dated March 6, 1860.

*To all whom it may concern:*

Be it known that I, N. R. CARRINGTON, of Cold Water, in the county of Marshall and State of Mississippi, have invented a new and Improved Cotton, Corn, and Pea Planter; and I do hereby declare that the following is a full and exact description thereof, reference being had to the accompanying drawings, making part of this specification—

Figure 1:
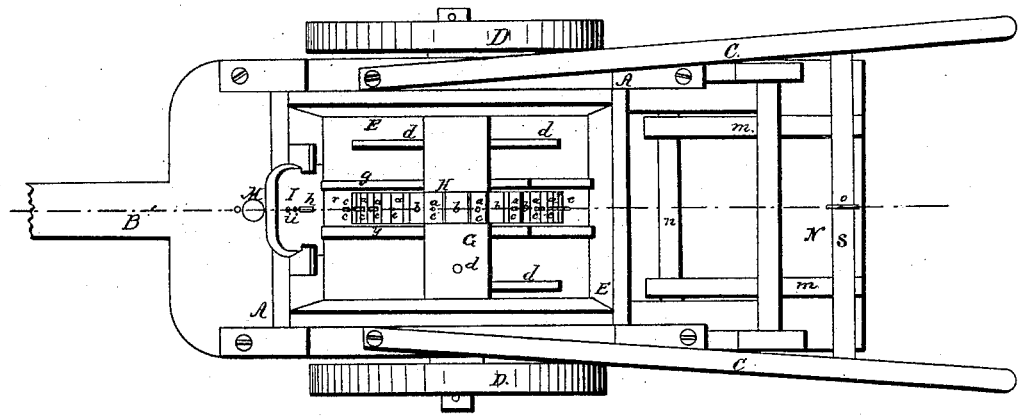
Figure 2:
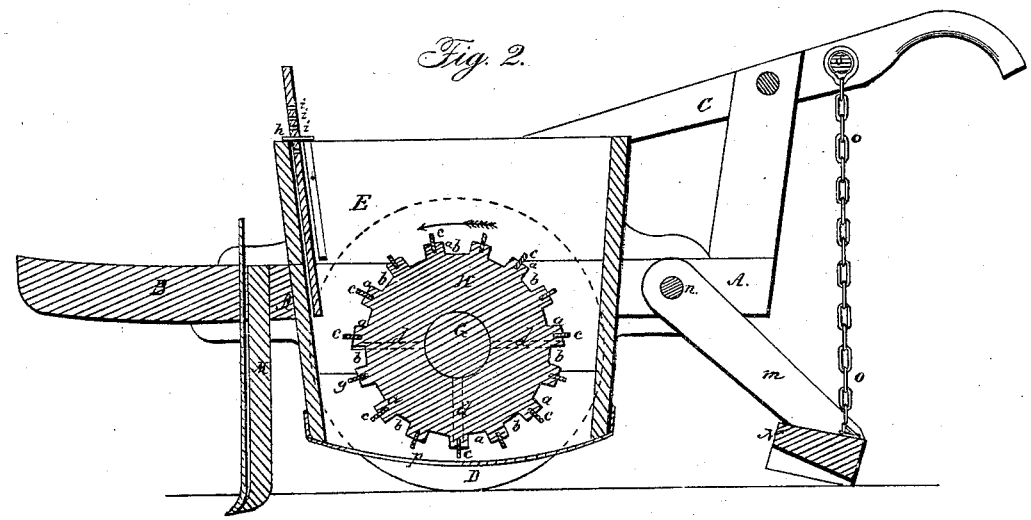
Figure 3:
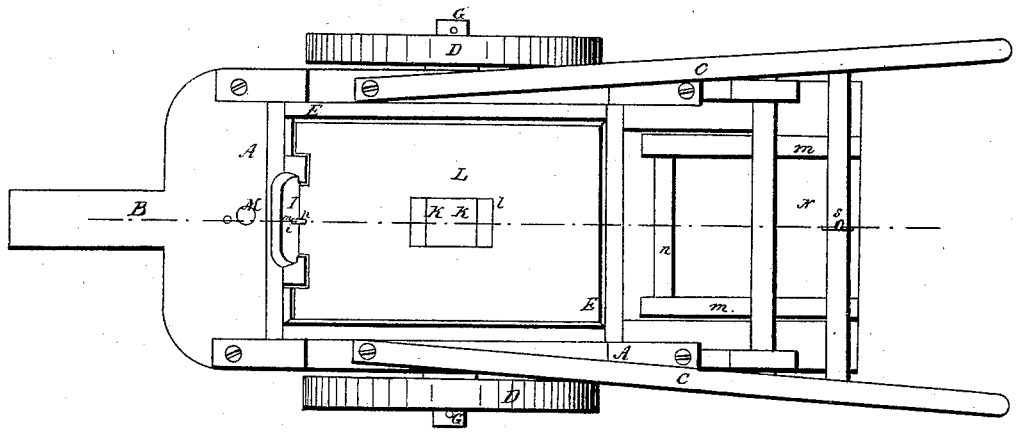
Figure 4:
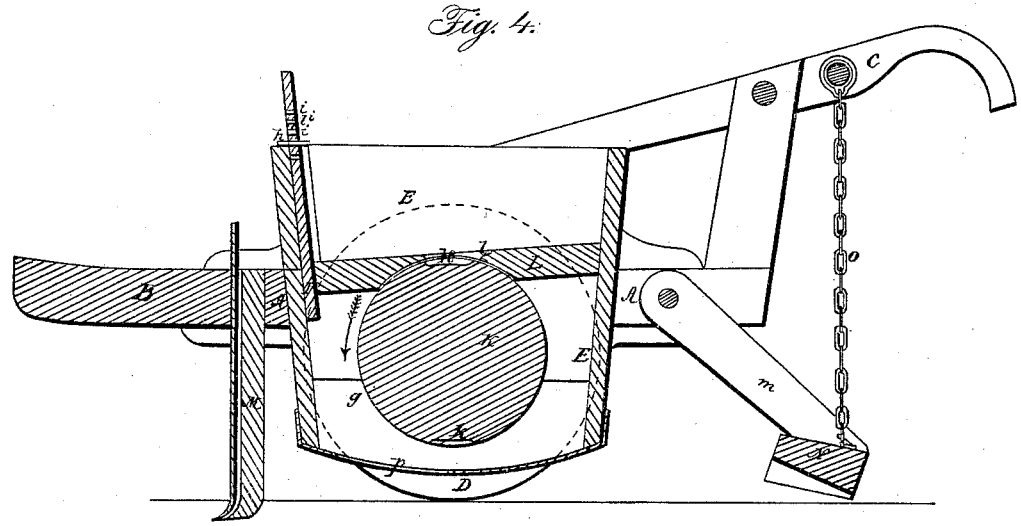

Figure 1 being a plan of my improved planter as arranged for planting cotton-seed; Fig. 2, a central longitudinal vertical section thereof arranged for the same purpose; Fig. 3, a plan of the machine as arranged for planting corn, peas, and other similar grains; Fig. 4, a central longitudinal vertical section thereof, arranged in the same manner.

Like letters designate corresponding parts in all the figures.

The frame A of the planter terminates in front with a beam, B, by which the machine is drawn. It is also provided with handles C C in any ordinary manner. A drill-tooth, M, is secured in the front end of the frame for opening the furrow for the reception of the seed. Behind the drill-tooth is a seed-box, E, the bottom thereof being closed, except an opening or passage, $p$, for the escape of the seeds into the furrow. An axle, G, extends through the seed-box, having the driving-wheels D D of the machine rigidly secured to the ends thereof, so that the axle will revolve with the wheels.

For planting cotton-seed, the axle has near its middle a vertical wheel, H, Figs. 1 and 2, which I call the "seeding-wheel." The lower portion of this wheel runs between two parallel boards or partitions, $g$ $g$, which form a trough, $r$, in the bottom of the seed-box, whereby the seed is prevented from escaping, except in front of the wheel.

The periphery of the seeding-wheel H is formed into alternate projections, $a$ $a$, and depressions $b$ $b$, and into each of these projections $a$ $a$ is driven a pin or nail, $c$. These pins, in connection with the projections and depressions of the seeding-wheel, as it turns in the mass of seed, catch and cause a regular discharge of it down through the trough to the furrow below.

In order to supply the seed in the sides of the seed-box regularly to the seeding-wheel, arms $d$ $d$ are secured to the axle on each side of the seeding-wheel, as shown most clearly in Fig. 1. These arms are of sufficient length to reach nearly to the bottom of the seed-box as they revolve, and on opposite sides of the seeding-wheel H they alternate in position, as represented in Fig. 1, so as to throw the seed across in front of said seeding-wheel first from one side and then from the opposite side thereof, thereby insuring a regular supply to the seeding-wheel.

In order to regulate the discharge of seed into the furrow, I use a sliding gate, I, placed in a tangential position in front of the seeding-wheel. It is adjustable up and down by a pin, $h$, fitting into any one of a set of holes, $i$ $i$ $i$, in said gate, or in any convenient manner. By raising or lowering this sliding gate the space in front of the seeding-wheel is increased or lessened in a more gradual and controllable manner than if the gate were placed transversely to the space, the size of which it regulates, and it thus interferes less with the free movement of the seed downward.

In planting corn, peas, and other seeds, except cotton-seed, I replace the cotton-seeding wheel H by another seeding-wheel, K, Figs. 3 and 4, of different construction. This seeding-wheel has cavities $k$ $k$, of suitable size to contain the necessary number of grains to be dropped at once. A cover, L, which I call the "false floor," fits into the seed-box immediately above the seeding-wheel, covering all below, except a small portion of the periphery of the seeding-wheel, which fits closely in an opening, $l$, in said false floor, as shown in Figs. 3 and 4.

The seed is covered by a drag, N, which may be secured in any convenient manner to the rear of the frame A. In the drawings it is represented as being secured to connecting-bars $m$ $m$, which turn on an axis, $n$, and as being connected by a chain, $o$, with a stretcher-bar, $s$, above, so as to limit the extent to which the drag may descend into the earth.

What I claim as my invention, and desire to secure by Letters Patent, is—

The combination and arrangement of the seeding-wheel H, constructed as described, the projecting arms $d$ $d$, alternating in action on the opposite sides of said seeding-wheel, and the tangential sliding gate I, substantially as specified and in combination therewith the false floor L, for adapting the variations of the seeding-wheels to different kinds of seeds, as set forth.

In witness that the above is a true specification of my improved cotton, corn, and pea planter, I hereunto set my hand this 12th day of July, 1859.

N. R. CARRINGTON.

Witnesses:
WILLIAM THERRILL,
JAS. H. KNOX.